United States Patent
Ueda et al.

(10) Patent No.: US 10,968,335 B2
(45) Date of Patent: Apr. 6, 2021

(54) RUBBER CROSSLINKED PRODUCT

(71) Applicant: ZEON CORPORATION, Tokyo (JP)

(72) Inventors: Eijun Ueda, Tokyo (JP); Misako Asada, Tokyo (JP); Hidenori Yamagishi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 102 days.

(21) Appl. No.: 16/325,070

(22) PCT Filed: Aug. 21, 2017

(86) PCT No.: PCT/JP2017/029796
§ 371 (c)(1),
(2) Date: Feb. 12, 2019

(87) PCT Pub. No.: WO2018/038054
PCT Pub. Date: Mar. 1, 2018

(65) Prior Publication Data
US 2019/0330454 A1  Oct. 31, 2019

(51) Int. Cl.
*C08L 15/00* (2006.01)
*B60C 1/00* (2006.01)
*C08K 3/36* (2006.01)
*C08C 19/25* (2006.01)

(52) U.S. Cl.
CPC ............... *C08L 15/00* (2013.01); *B60C 1/00* (2013.01); *C08K 3/36* (2013.01); *C08C 19/25* (2013.01); *C08L 2312/02* (2013.01); *C08L 2312/08* (2013.01)

(58) Field of Classification Search
None
See application file for complete search history.

(56) References Cited

U.S. PATENT DOCUMENTS

| | | |
|---|---|---|
| 2002/0179218 A1 | 12/2002 | Pierre et al. |
| 2013/0172481 A1 | 7/2013 | Okada et al. |
| 2016/0176992 A1 | 6/2016 | Dire et al. |
| 2016/0326274 A1 | 11/2016 | Sakurai et al. |
| 2017/0137541 A1 | 5/2017 | Anezaki et al. |

FOREIGN PATENT DOCUMENTS

| | | |
|---|---|---|
| EP | 2 615 134 A1 | 7/2013 |
| JP | 2003-531257 A | 10/2003 |
| WO | 2015/018772 A1 | 2/2015 |
| WO | 2015/098264 A1 | 7/2015 |
| WO | 2015/152038 A1 | 10/2015 |

OTHER PUBLICATIONS

Mar. 6, 2020 extended Search Report issued in European Patent Application No. 17843534.3.
Nov. 14, 2017 International Search Report issued in International Patent Application No. PCT/JP2017/029796.

*Primary Examiner* — Robert T Butcher
(74) *Attorney, Agent, or Firm* — Oliff PLC

(57) ABSTRACT

A cross-linked rubber obtained by crosslinking a rubber composition containing a conjugated diene rubber and an inorganic filler, wherein when a loss tangent value of a non-interface component forming, of the cross-linked rubber ingredient, a portion other than an interface with the inorganic filler is represented as L(m) and a loss tangent value of an interface component forming, of the cross-linked rubber ingredient, an interface portion with the inorganic filler is represented as L(i), each loss tangent value being measured using an atomic force microscope in a state in which sinusoidal vibrations of 5 kHz are applied to the cross-linked rubber, the cross-linked rubber has a ratio L(i)/L(m) of 0.85 or less.

9 Claims, No Drawings

RUBBER CROSSLINKED PRODUCT

TECHNICAL FIELD

The present invention relates to a cross-linked rubber obtained by crosslinking a rubber composition containing a conjugated diene rubber and an inorganic filler, and more particularly to a cross-linked rubber excellent in wet grip, low heat buildup and abrasion resistance.

BACKGROUND ART

In recent years, due to environmental issues and resource issues, strong demands have been placed on automotive tires to have lower heat buildup, and from a safety perspective excellent wet grip has also been sought. Tires obtained by using a rubber composition in which a conjugated diene rubber is mixed with silica as a filler exhibit lower heat buildup compared with tires obtained by using a rubber composition blended with conventionally used carbon black, and hence can be used to make tires that are more fuel efficient.

As a conjugated diene rubber used for providing such a fuel-efficient tire, Patent Document 1 discloses a conjugated diene rubber obtained by reacting a specific halogenated tin compound with a conjugated diene polymer chain having an isoprene block at one end and an active end at the other end.

RELATED ART

Patent Documents

Patent Document 1: National Publication of International Patent Application No. 2003-531257

SUMMARY OF THE INVENTION

Problem to be Solved by the Invention

However, in view of the recent increased demands placed on automotive tires, there is a need for a cross-linked rubber using a conjugated diene rubber to be newly developed to have much better low heat buildup, wet grip, as well as abrasion resistance than the cross-linked rubber that uses the conjugated diene rubber described in Patent Document 1.

The present invention was studied in the light of the current circumstances, and has as its object the provision of a cross-linked rubber excellent in wet grip, low heat buildup, and abrasion resistance.

Means for Solving the Problem

The present inventors engaged in intensive research regarding cross-linked rubbers obtained by crosslinking a rubber composition containing a conjugated diene rubber and an inorganic filler to achieve the above object, and as a result discovered that when a loss tangent value of a non-interface component forming, of the cross-linked rubber ingredient, a portion other than an interface with the inorganic filler is represented as L(m) and a loss tangent value of an interface component forming, of the cross-linked rubber ingredient, an interface portion with the inorganic filler is represented as L(i), each loss tangent value being measured using an atomic force microscope in a state in which sinusoidal vibrations of 5 kHz are applied to the cross-linked rubber, by controlling such that the cross-linked rubber has a ratio L(i)/L(m) in a specific range, a cross-linked rubber having excellent wet grip, low heat buildup, and abrasion resistance can be obtained, thereby completing the present invention.

More specifically, according to the present invention, there is provided a cross-linked rubber obtained by crosslinking a rubber composition containing a conjugated diene rubber and an inorganic filler, wherein when a loss tangent value of a non-interface component forming, of the cross-linked rubber ingredient, a portion other than an interface with the inorganic filler is represented as L(m) and a loss tangent value of an interface component forming, of the cross-linked rubber ingredient, an interface portion with the inorganic filler is represented as L(i), each loss tangent value being measured using an atomic force microscope in a state in which sinusoidal vibrations of 5 kHz are applied to the cross-linked rubber, the cross-linked rubber has a ratio L(i)/L(m) of 0.85 or less.

In the present invention, it is preferable that the conjugated diene rubber be a modified conjugated diene rubber having a modifying group.

In the present invention, it is preferable that the conjugated diene rubber be a modified conjugated diene rubber having a modifying group derived from a silicon atom-containing modifying agent.

In the present invention, it is preferable that the conjugated diene rubber be a modified conjugated diene rubber having a modifying group derived from a siloxane compound or a nitrogen-containing silane compound.

In the present invention, it is preferable that the conjugated diene rubber have a glass transition temperature (Tg) of −40 to −10° C.

In the present invention, it is preferable that the conjugated diene rubber have a vinyl bond content in a conjugated diene monomer unit of 0 to 70 mol %.

In the present invention, it is preferable that the inorganic filler have a content of 10 to 200 parts by weight with respect to 100 parts by weight of the rubber ingredient including the conjugated diene rubber in the rubber composition.

In the present invention, it is preferable that the inorganic filler be silica.

Further, according to the present invention, there is provided a tire comprising the above-mentioned cross-linked rubber.

Effects of Invention

According to the present invention, there are provided a cross-linked rubber excellent in wet grip, low heat buildup, and abrasion resistance, and a tire comprising the cross-linked rubber.

DESCRIPTION OF EMBODIMENTS

The cross-linked rubber according to the present invention is a cross-linked rubber obtained by crosslinking a rubber composition containing a conjugated diene rubber and an inorganic filler, wherein when a loss tangent value of a non-interface component forming, of the cross-linked rubber ingredient, a portion other than an interface with the inorganic filler is represented as L(m) and a loss tangent value of an interface component forming, of the cross-linked rubber ingredient, an interface portion with the inorganic filler is represented as L(i), each loss tangent value being measured using an atomic force microscope in a state in which sinusoidal vibrations of 5 kHz are applied to the cross-linked rubber, the cross-linked rubber is controlled such that a ratio L(i)/L(m) is 0.85 or less.

<Rubber Composition>

First, the rubber composition used in the present invention will be described.

The rubber composition used in the present invention is a composition of a conjugated diene rubber containing a conjugated diene rubber and an inorganic filler.

The conjugated diene rubber used in the present invention is not particularly limited as long as it is a polymer containing a conjugated diene monomer unit as a main structural unit. The conjugated diene rubber may be a homopolymer obtained by polymerizing one kind of conjugated diene compound, a copolymer obtained by copolymerizing two or more kinds of conjugated diene compounds, or a copolymer of one or more kinds of conjugated diene compounds and a monomer copolymerizable with the conjugated diene compound(s).

Examples of the conjugated diene compound include, but are not particularly limited to, 1,3-butadiene, isoprene, 2,3-dimethyl-1,3-butadiene, 1,3-pentadiene, 2-methyl-3-ethyl-1,3-butadiene, 2-methyl-1,3-pentadiene, 1,3-hexadiene, 1,3-cyclohexadiene, and the like. Among these as well, 1,3-butadiene, isoprene, and 1,3-pentadiene are preferable, and 1,3-butadiene and isoprene are particularly preferable. These conjugated diene compounds may be used as single type alone or may be used as two types or more combined.

The conjugated diene rubber used in the present invention may be a copolymer obtained by copolymerizing the conjugated diene compound and an aromatic vinyl compound. The aromatic vinyl compound is not particularly limited, and examples thereof include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, vinylnaphthalene, dimethylaminomethylstyrene, dimethylaminoethylstyrene, and the like. Among these as well, styrene, α-methylstyrene, and 4-methylstyrene are preferable, and styrene is particularly preferable. Further, these aromatic vinyl compounds may be used as single type alone or may be used as two types or more combined.

The conjugated diene rubber used in the present invention preferably contains 50 to 100% by weight of a conjugated diene monomer unit, more preferably 50 to 90% by weight, particularly preferably 50 to 80% by weight. Further, the content of the aromatic vinyl monomer unit is preferably 0 to 50% by weight, more preferably 10 to 50% by weight, particularly preferably 20 to 50% by weight.

The conjugated diene rubber used in the present invention may be obtained by copolymerizing, in addition to the conjugated diene compound, a conjugated diene compound other than the aromatic vinyl compound with another monomer copolymerizable therewith. Examples of the other monomer include α,β-unsaturated nitriles such as acrylonitrile and methacrylonitrile; unsaturated carboxylic acids or acid anhydrides such as acrylic acid, methacrylic acid, and maleic anhydride; unsaturated carboxylic acid esters such as methyl methacrylate, ethyl acrylate, and butyl acrylate; nonconjugated dienes such as 1,5-hexadiene, 1,6-heptadiene, 1,7-octadiene, dicyclopentadiene, and 5-ethylidene-2-norbornene; and the like. These monomers are preferably contained in the conjugated diene rubber as a monomer unit in an amount of 10% by weight or less, and more preferably 5% by weight or less.

The glass transition temperature (Tg) of the conjugated diene rubber used in the present invention is not particularly limited, but is preferably −40 to −10° C., more preferably −35 to −15° C., and even more preferably −30 to −17° C. When the glass transition temperature (Tg) is in the above range, the obtained cross-linked rubber exhibits even better abrasion resistance.

The vinyl bond content in the conjugated diene monomer unit in the conjugated diene rubber used in the present invention is not particularly limited, but is preferably 0 to 70 mol %, more preferably 8 to 65 mol %, and even more preferably 10 to 65 mol %. When the vinyl bond content is in the above range, the obtained cross-linked rubber exhibits even better abrasion resistance.

The weight average molecular weight (Mw) of the conjugated diene rubber used in the present invention is not particularly limited, but is preferably 50,000 to 2,000,000, more preferably 100,000 to 1,800,000, even more preferably 150,000 to 1,500,000, particularly preferably 300,000 to 1,200,000. The weight average molecular weight of the conjugated diene rubber can be obtained as a value in terms of polystyrene by gel permeation chromatography (hereinafter, also referred to as GPC) measurement. When the weight average molecular weight of the conjugated diene rubber is in the above range, the resulting cross-linked rubber exhibits even better abrasion resistance.

In addition, the molecular weight distribution represented by the ratio (Mw/Mn) of the number average molecular weight (Mn) to the weight average molecular weight (Mw) of the conjugated diene rubber used in the present invention is preferably 1.0 to 1.5, more preferably 1.0 to 1.4, particularly preferably 1.0 to 1.3. When the molecular weight distribution value (Mw/Mn) is in the above range, the obtained cross-linked rubber exhibits even better low heat buildup.

The conjugated diene rubber used in the present invention can be obtained by, for example, polymerizing in an inert solvent a monomer containing at least a conjugated diene compound using a polymerization initiator. It is preferable that the conjugated diene rubber used in the present invention to be polymerized by such a method, that is, a solution polymerization method.

Examples of the conjugated diene compound used as the monomer may include the same compounds as those exemplified for the conjugated diene compound that can be used for constituting the conjugated diene rubber. As the monomer, an aromatic vinyl compound may be used together with a conjugated diene compound. Examples of the aromatic vinyl compound used as the monomer may include the same compounds as those exemplified for the aromatic vinyl compound that can be used for constituting the conjugated diene rubber. As the monomer, another monomer copolymerizable with the conjugated diene compound other than the aromatic vinyl compound may be used together with the conjugated diene compound. Examples of the another monomer copolymerizable with the conjugated diene compound other than the aromatic vinyl compound used as the monomer include the same examples as those exemplified as the other monomer copolymerizable with the conjugated diene compound other than the aromatic vinyl compound that can be used for constituting the conjugated diene rubber.

The inert solvent used for the polymerization is not particularly limited so long as it is a solvent that is usually used in solution polymerization and does not detract from the polymerization reaction. Specific examples of the inert solvent include chain aliphatic hydrocarbons such as butane, pentane, hexane, heptane, and 2-butene; alicyclic hydrocarbons such as cyclopentane, cyclohexane, and cyclohexene; aromatic hydrocarbons such as benzene, toluene, and xylene; and the like. These inert solvents may be used as single type alone or as two or more types combined. The amount of use of the inert solvent is an amount in which the monomer concentration becomes, for example, 1 to 50% by weight, and preferably 10 to 40% by weight.

The polymerization initiator used for polymerization is not particularly limited so long it is able to cause a monomer containing a conjugated diene compound to polymerize to give a conjugated rubber. Specific examples thereof include an organic alkali metal compound, organic alkali earth metal compound, and a polymerization initiator having a lanthanide-series metal compound, etc. as a primary catalyst. Examples of the organic alkali metal compound include organic monolithium compounds such as n-butyllithium, sec-butyllithium, t-butyllithium, hexyllithium, phenyllithium, and stilbenelithium; organic polyvalent lithium compounds such as dilithiomethane, 1,4-dilithiobutane, 1,4-dilithio-2-ethylcyclohexane, 1,3,5-trilithiobenzene, and 1,3,5-tris(lithiomethyl)benzene; organic sodium compounds such as sodium naphthalene; organic potassium compounds such as potassium naphthalene; and the like. Further, examples of the organic alkali earth metal compound include di-n-butylmagnesium, di-n-hexylmagnesium, diethoxycalcium, calcium distearate, di-t-butoxystrontium, diethoxybarium, diisopropoxybarium, diethylmercaptobarium, di-t-butoxybarium, diphenoxybarium, diethylaminobarium, barium distearate, diketylbarium, and the like. Examples of the polymerization initiator having a lanthanide series metal compound as a primary catalyst include a polymerization initiator having a salt of a lanthanide series metal comprised of a lanthanide series metal such as lanthanum, cerium, praseodymium, neodymium, samarium, and gadolinium and a carboxylic acid, phosphorus-containing organic acid, etc. as a primary catalyst and comprised of this and a co-catalyst such as an alkylaluminum compound, organic aluminum hydride compound, and organic aluminum halide compound, and the like. Among these polymerization initiators, organic monolithium compound and organic polyvalent lithium compound are preferably used, an organic monolithium compound is more preferably used, and n-butyllithium is particularly preferably used. Note that, the organic alkali metal compound may be reacted in advance with a secondary amine such as dibutylamine, dihexylamine, dibenzylamine, pyrrolidine, hexamethyleneimine, and heptamethyleneimine and be used as an organic alkali metal amide compound. These polymerization initiators may be used as single type alone or as two or more types combined.

The amount of use of the polymerization initiator may be determined in accordance with the targeted molecular weight of the conjugated diene rubber, but is usually 1 to 50 mmoles with respect to 1000 g of the monomer, preferably 1.5 to 20 mmoles, more preferably 2 to 15 mmoles in range.

The polymerization temperature is usually −80 to +150° C., preferably 0 to 100° C., more preferably 30 to 90° C. in range. As the polymerization process, a batch process, continuous process, or any other process can be employed, but when copolymerizing a conjugated diene compound and aromatic vinyl compound, the batch process is preferable in the point of facilitating control of the randomness of bonds between the conjugated diene monomer units and aromatic vinyl monomer units.

When the conjugated diene rubber is composed of two or more monomer units, the bonding mode of those units can be various bonding modes such as, for example, a block shape, a taper shape, a random shape, or the like. However, a random bonding mode is preferable. A random bonding mode enables higher low heat buildup of the obtained rubber cross-linked product.

Further, in polymerization of a monomer containing a conjugated diene compound, to adjust the vinyl bond content in the conjugated diene monomer units in the obtained conjugated diene rubber, it is preferable to add a polar compound to the inert organic solvent. Examples of the polar compound include ether compounds such as dibutyl ether and tetrahydrofuran; tertiary amines such as tetramethylethylenediamine; alkali metal alkoxides; phosphine compounds; and the like. Among these as well, an ether compound and a tertiary amine are preferable, a tertiary amine is more preferable, and tetramethylethylenediamine is particularly preferable. These polar compounds may be used as single type alone or as two or more types combined. The amount of use of the polar compound may be determined in accordance with the targeted vinyl bond content and is preferably 0.001 to 100 moles with respect to 1 mole of the polymerization initiator, more preferably 0.01 to 10 moles. If the amount of use of the polar compound is in this range, adjustment of the vinyl bond content in the conjugated diene monomer units is easy and the problem of deactivation of the polymerization initiator hardly ever arises.

As described above, the conjugated diene rubber can be obtained in an inert solvent. Further, since the conjugated diene rubber obtained in this manner usually has an active end, after the completion of the polymerization reaction, unreacted active ends are deactivated by adding a polymerization terminator to the polymerization solution. From the viewpoint of making the effects of the present invention more remarkable, it is preferable to form the conjugated diene rubber as a modified conjugated diene rubber having a modifying group by further reacting various modifying agents to such an active end.

The modifying agent is not particularly limited, and a modifying agent that is usually used as a modifying agent for a polymer can be used. However, from the viewpoint of enabling the affinity with inorganic fillers such as silica to be appropriately increased, and enabling the obtained cross-linked rubber to have better wet grip, low heat buildup, and abrasion resistance, a silicon atom-containing modifying agent is preferable, and a siloxane compound or a nitrogen-containing silane compound is more preferable.

The siloxane compound is not particularly limited as long as it has a siloxane structure (—Si—O—) as a main chain structure. An organosiloxane having an organic group in a side chain is preferable, and a polyorganosiloxane represented by the following general formula (1) is more preferable.

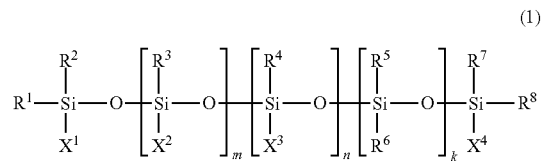

(1)

In the general formula (1), $R^1$ to $R^8$ are an alkyl group having 1 to 6 carbon atoms, or an aryl group having 6 to 12 carbon atoms, these may be the same or may be different from each other; $X^1$ and $X^4$ are any group selected from the group consisting of an alkyl group having 1 to 6 carbon atoms, aryl group having 6 to 12 carbon atoms, alkoxy group having 1 to 5 carbon atoms, and epoxy-group containing group having 4 to 12 carbon atoms, these may be the same or may be different from each other; $X^2$ is an alkoxy group having 1 to 5 carbon atoms, or epoxy-group containing group having 4 to 12 carbon atoms, when there are a plural number of $X^2$, they may be the same or may be different from each other; $X^3$ is a group containing 2 to 20 repeating units of alkylene glycol, when there are a plural number of $X^3$, they may be the same or may be different from each other; "m" is an integer of 0 to 200, "n" is an integer of 0 to 200, "k" is an integer of 0 to 200, and m+n+k is 1 or more.

In the polyorganosiloxane represented by the general formula (1), examples of the alkyl group having 1 to 6 carbon atoms which may form $R^4$ to $R^8$, $X^4$ and $X^4$ in the general formula (1) include methyl group, ethyl group, n-propyl group, isopropyl group, butyl group, pentyl group, hexyl group, cyclohexyl group, and the like. Examples of the aryl group having 6 to 12 carbon atoms include phenyl group, methylphenyl group, and the like. Among these as well, methyl group and ethyl group are preferable in the point of easy production of polyorganosiloxane itself.

Further, in the polyorganosiloxane represented by the general formula (1), examples of the alkoxy group having 1 to 5 carbon atoms which may form $X^1$, $X^2$ and $X^4$ include methoxy group, ethoxy group, propoxy group, isopropoxy group, butoxy group, and the like. Among these as well, methoxy group and ethoxy group are preferable in the point of easy production of polyorganosiloxane itself.

Furthermore, in the polyorganosiloxane represented by the general formula (1), examples of the epoxy-group containing group having 4 to 12 carbon atoms which may form $X^1$, $X^2$ and $X^4$ include a group represented by the following general formula (2).

$$-Z^1-Z^2\text{-E} \quad (2)$$

Wherein, in the general formula (2), $Z^1$ represents an alkylene group or alkylarylene group having 1 to 10 carbon atoms, $Z^2$ represents methylene group, sulfur atom or oxygen atom, and E represents a hydrocarbon group having an epoxy group and 2 to 10 carbon atoms.

The group represented by the general formula (2) is preferably one where $Z^2$ is an oxygen atom, more preferably one where $Z^2$ is an oxygen atom and E is a glycidyl group, particularly preferably one where $Z^1$ is an alkylene group having 1 to 3 carbon atoms, $Z^2$ is an oxygen atom and E is a glycidyl group.

Further, in the polyorganosiloxane represented by the general formula (1), $X^1$ and $X^4$ are preferably, of the above, an epoxy-group containing group having 4 to 12 carbon atoms or an alkyl group having 1 to 6 carbon atoms. Further, $X^2$ is preferably, of the above, epoxy-group containing group having 4 to 12 carbon atoms. Further, it is more preferable that $X^1$ and $X^4$ be an alkyl group having 1 to 6 carbon atoms and $X^2$ be an epoxy-group containing group having 4 to 12 carbon atoms.

Further, in the polyorganosiloxane represented by the general formula (1), $X^3$, that is, the group containing repeating units of 2 to 20 alkylene glycol, is preferably a group represented by the following general formula (3).

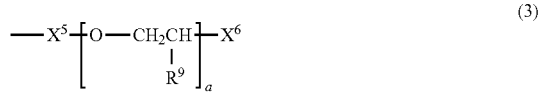

Wherein, in the general formula (3), "a" is an integer of 2 to 20, $X^5$ is an alkylene group or alkylarylene group having 2 to 10 carbon atoms, $R^9$ is hydrogen atom or methyl group, and $X^6$ is an alkoxy group or aryloxy group having 1 to 10 carbon atoms. Among these as well, one where "a" is an integer of 2 to 8, $X^5$ is an alkylene group having 3 carbon atoms, $R^9$ is hydrogen atom, and $X^6$ is methoxy group is preferable.

In the polyorganosiloxane represented by the general formula (1), "m" is an integer of 0 to 200, preferably an integer of 20 to 150, more preferably an integer of 30 to 120. When "m" is 200 or less, the polyorganosiloxane represented by the general formula (1) itself is easily produced and the viscosity thereof does not become too high, resulting in easy handling.

Further, in the polyorganosiloxane represented by the general formula (1), "n" is an integer of 0 to 200, preferably an integer of 0 to 150, more preferably an integer of 0 to 120. "k" is an integer of 0 to 200, preferably an integer of 0 to 150, more preferably an integer of 0 to 130. The total number of "m", "n" and "k" is 1 or more, preferably 2 to 400, more preferably 20 to 300, particularly preferably 30 to 250. When the total number of "m", "n" and "k" is 1 or more, the reaction of the polyorganosiloxane represented by the general formula (1) and the active end of the conjugated diene rubber easily proceeds, and further the total number of "m", "n" and "k" is 400 or less, the polyorganosiloxane represented by the general formula (1) itself is easily produced and the viscosity thereof does not become too high, resulting in easy handling.

Further, the nitrogen-containing silane compound is not particularly limited as long as it contains a nitrogen atom and a silicon atom in one molecule. For example, the following compounds and the like can be used.

Specifically, examples of a first specific example of the nitrogen-containing silane compound include a compound represented by the following general formula (4).

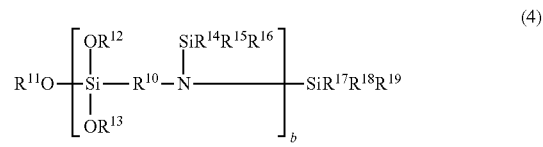

(wherein in the general formula (4), $R^{10}$ is an alkylene group having 1 to 12 carbon atoms, and when there are a plurality of $R^{10}$, they may be the same or different from each other; $R^{11}$ to $R^{19}$ each independently represents an alkyl group having 1 to 6 carbon atoms or an aryl group having 6 to 12 carbon atoms; and "b" is an integer of 1 to 10.)

Specific examples of the alkyl group having 1 to 6 carbon atoms and the aryl group having 6 to 12 carbon atoms in the compound represented by the above general formula (4) include the same examples as mentioned for the general formula (1).

In the compound represented by the general formula (4), examples of the alkylene group having 1 to 12 carbon atoms include a methylene group, an ethylene group, a propylene group, and the like. Among these as well, a propylene group is preferable.

Specific examples of the hydrocarbyloxysilane compound represented by the general formula (4) include N,N-bis(trimethylsilyl)-3-aminopropyltrimethoxysilane, N,N-bis(trimethylsilyl)-3-aminopropyltriethoxysilane, N,N-bis(trimethylsilyl) aminoethyltrimethoxysilane, N,N-bis(trimethylsilyl)aminoethyltriethoxysilane, and the like.

Further, examples of a second specific example of the nitrogen-containing silane compound include a compound represented by the following general formula (5).

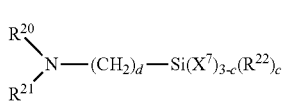

(5)

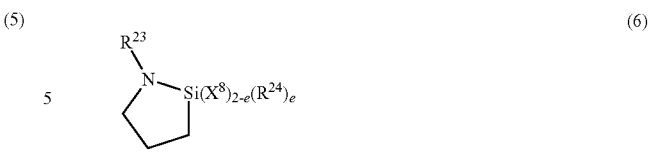

(6)

In the general formula (5), $R^{20}$ and $R^{21}$ each independently represents an organic group having 1 to 20 carbon atoms, preferably an alkyl group having 1 to 6 carbon atoms, an alkenyl group having 2 to 6 carbon atoms, or an aryl group having 6 to 18 carbon atoms, more preferably an alkyl group having 1 to 6 carbon atoms or an aryl group having 6 to 12 carbon atoms, and still more preferably a methyl group, an ethyl group, or a benzyl group. Further, $X^7$ represents a functional group selected from a hydrocarbyloxy group, halogen group, and hydroxyl group. The hydrocarbyloxy group which may form the functional group represented by $X^7$ is not particularly limited, and examples thereof may include an alkoxy group such as methoxy group, ethoxy group, n-propoxy group, isopropoxy group, n-butoxy group, isobutoxy group, sec-butoxy group, and tert-butoxy group; an alkenyloxy group such as a vinyloxy group and allyloxy group; an aryloxy group such as a phenoxy group and naphthoxy group; an aralkyloxy group such a benzyloxy group; and the like. Among these as well, an alkoxy group or aryloxy group is preferable, an alkoxy group is more preferable, and methoxy group or ethoxy group is particularly preferable. Further, the halogen group which may form $X^7$ is not particularly limited, and examples thereof may include a fluoro group, chloro group, bromo group, or iodo group. Among these as well, a chloro group is preferable. Further, $X^7$ may be a hydroxyl group. Such a hydroxyl group may be a hydroxyl group obtained by hydrolyzing a hydrocarbyloxy group or halogen group. $R^{22}$ is an alkyl group having 1 to 6 carbon atoms, preferably a methyl group or an ethyl group. "c" is an integer of 0 to 2, "d" is an integer of 1 to 10, and preferably an integer of 1 to 6. When there are a plurality of $X^7$ or $R^{22}$, the plurality of $X^7$ or $R^{22}$ may be the same or different from each other.

Specific examples of the compound represented by the above general formula (5) include 3-(N,N-dimethylamino)propyltriethoxysilane, 3-(N,N-diethylamino)propyltrimethoxysilane, 3-(N,N-diethylamino)propyltriethoxysilane, 3-(N,N-diethylamino)propyltrimethoxysilane, 3-(N,N-dimethylamino) propyldiethoxymethylsilane, 3-(N-benzyl-N-methylamino) propyltrimethoxymethylsilane, 3-(N-phenyl-N-propylamino)pentyltrimethoxysilane, 3-(N,N-dimethylamino)propyltriethoxysilane, 3-(N,N-dimethylamino)propyltrimethoxysilane, 3-(N-allyl-N-methylamino)propyltrimethoxysilane, 3-(N,N-dimethylamino)propyldimethylethoxysilane, 3-(N,N-dimethylamino)propyltriethoxysilane, 3-(N,N-dimethylamino)propyltrimethoxysilane, 3-(N,N-dimethylamino) propyldiisopropylethoxysilane, 3-(N-methyl-N-phenylamino)propyltrimethoxysilane, 3-N,N-bis [trimethylsilyl]amino)propyltrimethoxysilane, 3-(N,N-diethylamino)propyltrichlorosilane, and the like.

In addition, examples of a third specific example of the nitrogen-containing silane compound include a compound represented by the following general formula (6).

In the general formula (6), $R^{23}$ represents an organic group having 1 to 20 carbon atoms, preferably an alkyl group having 1 to 20 carbon atoms or an aryl group having 6 to 18 carbon atoms, and more preferably an alkyl group having 1 to 10 carbon atoms or an aryl group having 6 to 12 carbon atoms. $X^8$ represents a functional group selected from a hydrocarbyloxy group, a halogen group, and a hydroxyl group, and specific examples thereof may be the same as for $X^7$ in the general formula (5). $R^{24}$ represents an alkyl group having 1 to 6 carbon atoms, and preferably a methyl group or an ethyl group. "e" is an integer of 0 to 1. When there are a plurality of $X^8$, the plurality of $X^8$ may be the same or different from each other.

Specific examples of the compound represented by the general formula (6) include 2,2-dimethoxy-1-phenyl-1-aza-2-silacyclopentane, 2,2-diethoxy-1-phenyl-1-aza-2-silacyclopentane, 2,2-dipropoxy-1-phenyl-1-aza-2-silacyclopentane, 2,2-dimethoxy-1-butyl-1-aza-2-silacyclopentane, 2,2-diethoxy-1-butyl-1-aza-2-silacyclopentane, 2,2-dipropoxy-1-butyl-1-aza-2-silacyclopentane, 2,2-dimethoxy-1-trimethylsilyl-2-silacyclopentane, 2,2-dichloro-1-phenyl-1-aza-2-silacyclopentane, and the like.

Still further, examples of a fourth specific example of the nitrogen-containing silane compound include a compound represented by the following general formula (7).

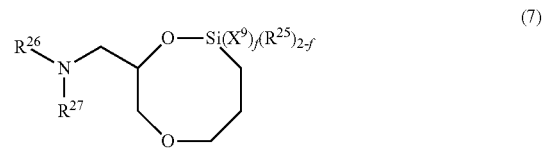

(7)

In the general formula (7), $X^9$ represents a functional group selected from a hydrocarbyloxy group, a halogen group, and a hydroxyl group, $R^{25}$ represents a substituted or unsubstituted hydrocarbon group, $R^{26}$ and $R^{27}$ each independently represents a substituted or unsubstituted hydrocarbon group having 1 to 20 carbon atoms, $R^{26}$ and $R^{27}$ may bond with each other to form a ring structure together with the nitrogen atom to which they are bound, when forming the ring structure they may form a ring structure together with a hetero atom other than the nitrogen atom to which they are bound in addition to the nitrogen atom to which they are bound, and "f" is an integer of 1 to 2.

In the general formula (7), $X^9$ represents a functional group selected from a hydrocarbyloxy group, halogen group, and hydroxyl group. Specific examples thereof may be the same as for $X^7$ of the above general formula (5).

Further, in the general formula (7), "f" (that is, the number of functional groups represented by $X^9$ in the formula (7)) is an integer of 1 to 2, and preferably 2. When "f" in the general formula (7) is 2, the two groups represented by $X^9$ contained in one molecule of the compound represented by the general formula (1) may be the same or different from each other.

In the general formula (7), $R^{25}$ represents a substituted or unsubstituted hydrocarbon group. The hydrocarbon group which may form $R^{25}$ is not particularly limited, and examples thereof may include an alkyl group such as methyl group, ethyl group, n-propyl group, isopropyl group, n-butyl group, isobutyl group, sec-butyl group, and tert-butyl group; an alkenyl group such as vinyl group and allyl group; an alkynyl group such as ethynyl group and propynyl group; an aryl group such as phenyl group and naphthyl group; an aralkyl group such as benzyl group; and the like. Among these as well, an alkyl group or aryl group are preferable, and an alkyl group is more preferable. Further, the hydrocarbon group represented by $R^{25}$ may have a substituent other than a hydrocarbon group. The substituent is not particularly limited, and examples thereof may include a carbonyl-group containing group such as a carboxyl group, acid anhydride group, hydrocarbylcarbonyl group, alkoxycarbonyl group, and acyloxy group or an epoxy group, oxy group, cyano group, amino group, halogen group, and the like.

In the general formula (7), $R^{26}$ and $R^{27}$ each independently represents a substituted or unsubstituted hydrocarbon group having 1 to 20 carbon atoms. $R^{26}$ and $R^{27}$ may bond with each other to form a ring structure together with the nitrogen atom represented by "N" in the general formula (7). When $R^{26}$ and $R^{27}$ do not bond with each other, the hydrocarbon group which may form $R^{26}$ and $R^{27}$ is not particularly limited, and examples thereof may include an alkyl group such as methyl group, ethyl group, n-propyl group, isopropyl group, n-butyl group, isobutyl group, sec-butyl group, and tert-butyl group; an alkenyl group such as vinyl group and allyl group; an alkynyl group such as ethynyl group and propynyl group; an aryl group such as phenyl group and naphthyl group; an aralkyl group such as a benzyl group; and the like. Among these as well, an alkyl group or aryl group are preferable, an alkyl group is more preferable, and methyl group are ethyl group are particularly preferable. Further, when $R^{26}$ and $R^{27}$ bond with each other to form a ring structure, the divalent hydrocarbon group comprised of $R^{26}$ and $R^{27}$ bonded together is not particularly limited, and examples thereof may include an n-butylene group (when forming 1-pyrrolidine group together with the nitrogen atom represented by "N" in the general formula (7)) an n-pentylene group (when forming 1-piperidine group), a butadienylene group (when forming 1-pyrrole group), and the like.

Further, the hydrocarbon group represented by $R^{26}$ and $R^{27}$ may have a substituent other than the hydrocarbon group regardless of whether forming a ring structure. The substituent is not particularly limited, and examples thereof may include a carbonyl-group containing group such as a carboxyl group, acid anhydride group, hydrocarbylcarbonyl group, alkoxycarbonyl group, and acyloxy group or an epoxy group, oxy group, cyano group, amino group, halogen group, and the like. Furthermore, when the $R^{26}$ and $R^{27}$ bond with each other to form a ring structure together with the nitrogen represented by "N" in the general formula (7), as the atom forming the ring structure, a carbon atom and hetero atom may be included other than the nitrogen atom to which they are bound. Examples of the hetero atom include nitrogen atom and oxygen atom.

In the present invention, among the compounds represented by the general formula (7), examples of particularly preferable compounds include compounds where the hydrocarbon groups represented by $R^{26}$ and $R^{27}$ bond with each other to form a piperazine ring structure together with the nitrogen atom represented by "N" in the general formula (7).

More specifically, it is preferable to use a compound represented by the following general formula (8).

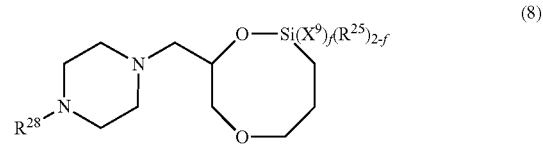

(8)

Wherein, in the general formula (8), $X^9$, $R^{25}$, and "f" all represent the same as in the general formula (7), and $R^{28}$ represents a hydrocarbon group having 1 to 20 carbon atoms.

In the general formula (8), $R^{28}$ represents a hydrocarbon group having 1 to 20 carbon atoms. The hydrocarbon group which may form R is not particularly limited, and examples thereof may include an alkyl group such as methyl group, ethyl group, n-propyl group, isopropyl group, n-butyl group, isobutyl group, sec-butyl group, and tert-butyl group; an alkenyl group such as vinyl group and allyl group; an alkynyl group such as ethynyl group and propynyl group; an aryl group such as phenyl group and naphthyl group; an aralkyl group such as benzyl group; and the like. Among these as well, an alkyl group or aryl group are preferable, an alkyl group is more preferable, and methyl group is particularly preferable.

Specific examples of the compound represented by the general formula (7) include 2,2-dimethoxy-8-(4-methylpiperazinyl)methyl-1,6-dioxa-2-silacyclooctane, 2,2-diethoxy-8-(4-methylpiperazinyl)methyl-1,6-dioxa-2-silacyclooctane, 2,2-dimethoxy-8-(N,N-diethylamino)methyl-1,6-dioxa-2-silacyclooctane, 2-methoxy-2-methyl-8-(4-methylpiperazinyl)methyl-1,6-dioxa-2-silacyclooctane, 2,2-dichloro-8-(4-methylpiperazinyl)methyl-1,6-dioxa-2-silacyclooctane, and the like.

Further, examples of a fifth specific example of the nitrogen-containing silane compound include a compound represented by the following general formula (9).

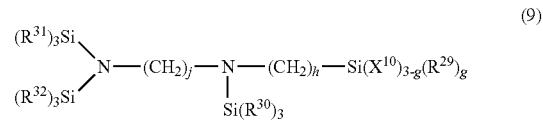

(9)

In the above general formula (9), $X^{10}$ represents a functional group selected from a hydrocarbyloxy group, a halogen group and a hydroxyl group, and specific examples thereof may be the same as for $X^7$ in the above general formula (5). $R^{29}$ represents an alkyl group having 1 to 6 carbon atoms, and preferably a methyl group or an ethyl group. $R^{30}$, $R^{31}$, and $R^{32}$ each independently represents an organic group having 1 to 20 carbon atoms, preferably an alkyl group having 1 to 6 carbon atoms, and more preferably a methyl group or an ethyl group. "g" is an integer of 0 to 2, "h" is an integer of 1 to 10, and "j" is an integer of 1 to 10. When there are a plurality of $X^{10}$ or $R^{29}$, the plurality of $X^{10}$ or $R^{29}$ may be the same or different from each other.

Specific examples of the compound represented by the above general formula (9) include 3-[N-2-{N',N'-bis(trimethylsilyl)amino}ethyl-N-trimethylsilylamino]propyltriethoxysilane, 3-[N-2-{N',N'-bis(triethylsilyl)amino}ethyl-N-triethylsilylamino]propyltriethoxysilane, 3-[N-2-{N',N'- bis(triethylsilyl)amino}ethyl-N-triethylsilylamino]
propyltrichlorosilane, and the like.

In addition, examples of a sixth specific example of the nitrogen-containing silane compound include a compound represented by the following general formula (10).

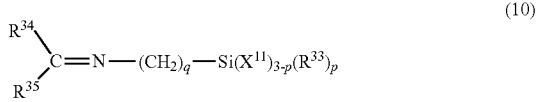

$$\underset{R^{35}}{\overset{R^{34}}{\diagdown}}C{=}N{-}(CH_2)_q{-}Si(X^{11})_{3\text{-}p}(R^{33})_p \quad (10)$$

In the above general formula (10), $X^{11}$ represents a functional group selected from a hydrocarbyloxy group, a halogen group and a hydroxyl group, and specific examples thereof may be the same as for $X^7$ in the above general formula (5). $R^{33}$ represents an alkyl group having 1 to 6 carbon atoms, and preferably a methyl group or an ethyl group. $R^{34}$ and $R^{35}$ each independently represents a hydrogen atom, an organic group having 1 to 20 carbon atoms, preferably an alkyl group having 1 to 6 carbon atoms, an alkenyl group having 2 to 6 carbon atoms, or an aryl group having 6 to 18 carbon atoms. "p" is an integer of 0 to 2 and "q" is an integer of 1 to 10. When there are a plurality of $X^{11}$ or $R^{33}$, the plurality of $X^{11}$ or $R^{13}$ may be the same or different from each other.

Specific examples of the compound represented by the above general formula (10) include N-(3-triethoxysilylpropyl)-4-methylpentan-2-imine, N-(3-trimethoxysilylpropyl)-4-methylpentan-2-imine, N-(3-triethoxysilylpropyl)propan-2-imine, N-(3-triethoxysilylpropyl)pentan-3-imine, N-(3-trichlorosilylpropyl)-4-methylpentan-2-imine, and the like.

Among the above-mentioned nitrogen-containing silane compounds, preferable is a compound represented by the above general formula (5), general formula (7), or general formula (9), more preferable is a compound represented by the general formula (5) or general formula (7), and particularly preferable is a compound represented by the above general formula (7).

The amount of use of the modifying agent when reacting the modifying agent with the active end of the conjugated diene rubber is not particularly limited, but the amount of the modifying agent with respect to 1 mol of the active end of the conjugated diene rubber having an active end (in the case of using an organic alkali metal compound as a polymerization initiator, the amount of modifying agent with respect to 1 mol of the metal atom in the organic alkali metal compound) is preferably 0.01 to 10.0 moles, more preferably 0.02 to 5.0 moles, particularly preferably 0.05 to 2.0 moles. The modifying agent may be used as single type alone or as two or more types combined.

The method of reacting the modifying agent with the active end of the conjugated diene rubber is not particularly limited, and an example of such a method may include mixing the conjugated diene rubber having an active end and the modifying agent in a solvent capable of dissolving the conjugated diene rubber and the modifying agent. Examples of the solvent used at this time include the same solvents as those exemplified above as the solvent to be used in the polymerization of the conjugated diene rubber. Further, at this time, it is simple and preferable to add the conjugated diene rubber having an active end to the modifying agent in the state that the conjugated diene rubber is in the polymerization solution used for the polymerization. It is also noted that during this operation, the modifying agent may be added to the polymerization system by dissolving it in the inert solvent to be used for the polymerization, and the concentration of that solution is preferably 1 to 50% by weight in range. The reaction temperature is not particularly limited, but is usually 0 to 120° C. The reaction time is also not particularly limited, but is usually 1 minute to 1 hour.

The timing for adding the modifying agent to the solution containing the conjugated diene rubber having an active end is not particularly limited, but it is preferable to add modifying agent to this solution in the state where the polymerization reaction is not completed and the solution containing the conjugated diene rubber having an active end which also contains a monomer, more specifically, in the state where the solution containing the conjugated diene rubber having an active end contains 100 ppm or more of monomer, more preferably 300 to 50,000 ppm of monomer. By adding modifying agent in this way, it becomes possible to suppress secondary reactions between the conjugated diene rubber having an active end and impurities, etc. contained in the polymerization system and to control the reaction well.

Before reacting the modifying agent with the conjugated diene rubber having an active end, within a range that does not inhibit the effects of the present invention, a part of the active ends of the conjugated diene rubber may be inactivated by adding a coupling agent or the like that has conventionally been ordinarily used to the polymerization system.

If unreacted active ends remain after reacting the modifying agent with the conjugated diene rubber having an active end, it is preferable to deactivate the unreacted active end by adding a polymerization terminator, such as an alcohol like methanol, ethanol, isopropanol, or the like, or water to the polymerization solution.

An antiaging agent such as a phenol-based stabilizing agent, phosphorus-based stabilizing agent, and sulfur-based stabilizing agent, may be added, if desired, to the solution of the thus-obtained conjugated diene rubber (including cases of a modified conjugated diene rubber; hereinafter the same). The added amount of the antiaging agent may be determined as appropriate. In addition, if desired, an oil extender may be blended to produce an oil extended rubber. Examples of the oil extender include paraffin-based, aromatic-based, and naphthene-based oil-based softening agents, plant-based softening agents, fatty acids, and the like. When using an oil-based softening agent, the content of the polycyclic aromatic compound extracted by the method of IP346 (test method of THE INSTITUTE PETROLEUM of the U.K.) is preferably less than 3%. When using an oil extender, the amount of use is usually 5 to 100 parts by weight with respect to 100 parts by weight of the conjugated diene rubber.

The thus-obtained conjugated diene rubber can be obtained as a solid conjugated diene rubber by separating it from the reaction mixture by, for example, removing the solvent by steam stripping.

The rubber composition used in the present invention contains an inorganic filler in addition to the conjugated diene rubber described above.

The inorganic filler is not particularly limited, but at least one inorganic filler selected from silica and carbon black is preferable. From the point that the obtained cross-linked rubber exhibits excellent low heat buildup, silica is more preferable.

Examples of the silica include dry white carbon, wet white carbon, colloidal silica, precipitated silica, and the like. Among these as well, wet white carbon mainly comprised of hydrous silicic acid is preferable. Further, a carbon-silica dual phase filler comprised of carbon black on the surface of which silica is carried may be used. These silicas can be used as single type alone or as two or more types combined. The nitrogen adsorption specific surface area of the silica which is used (measured by BET method based on ASTM D3037-81) is preferably 50 to 300 m$^2$/g, more preferably 80 to 220 m$^2$/g, particularly preferably 100 to 170 m$^2$/g. Further, the pH of the silica is preferably 5 to 10.

Examples of the carbon black include furnace black, acetylene black, thermal black, channel black, graphite, and the like. In the case of using carbon black, it is preferable to use furnace black, and specific examples thereof include SAF, ISAF, ISAF-HS, ISAF-LS, IISAF-HS, HAF, HAF-HS, HAF-LS, T-HS, T-NS, MAF, FEF, and the like. These carbon blacks can be used as single type alone or as two or more types combined.

The amount of inorganic filler in the rubber composition used in the present invention is preferably 10 to 200 parts by weight with respect to 100 parts by weight of the rubber ingredients, including the conjugated diene rubber, in the rubber composition, more preferably 30 to 150 parts by weight, and even more preferably 40 to 100 parts by weight. By making the amount of the inorganic filler the above range, the processability of the rubber composition becomes excellent and the obtained cross-linked rubber is excellent in wet grip and low heat buildup.

When using silica as the inorganic filler in the rubber composition used in the present invention, from the viewpoint of further improvement of low heat buildup, a silane coupling agent may be further added. Examples of the silane coupling agent include vinyltriethoxysilane, β-(3,4-epoxycyclohexyl)ethyltrimethoxysilane, N-(β-aminoethyl)-γ-aminopropyltrimethoxysilane, 3-octanoylthio-1-propyl-triethoxysilane, bis(3-(triethoxysilyl)propyl) disulfide, bis(3-(triethoxysilyl)propyl) tetrasulfide, γ-trimethoxysilylpropyldimethylthiocarbamyl tetrasulfide, γ-trimethoxysilylpropylbenzothiazyl tetrasulfide, and the like. These silane coupling agents can be used as single type alone or as two or more types combined. The amount of the silane coupling agent is preferably 0.1 to 30 parts by weight with respect to 100 parts by weight of the silica, more preferably 1 to 15 parts by weight.

Further, the rubber composition used in the present invention preferably further contains a cross-linking agent. Examples of the cross-linking agent include a sulfur-containing compound such as sulfur or halogenated sulfur, an organic peroxide, quinone dioximes, an organic polyvalent amine compound, an alkylphenol resin having a methylol group, and the like. Among these as well, sulfur is preferably used. The amount of the cross-linking agent is preferably 0.1 to 15 parts by weight with respect to 100 parts by weight of the rubber ingredients, including the conjugated diene rubber, in the rubber composition, more preferably 0.5 to 5 parts by weight, particularly preferably 1 to 4 parts by weight.

Further, the rubber composition used in the present invention may have mixed with it, other than the above ingredients, in accordance with ordinary methods, compounding ingredients such as a cross-linking accelerator, cross-linking activator, antiaging agent, organic filler, activating agent, process oil, plasticizer, slip agent, and tackifier in respectively required amounts.

When using sulfur or a sulfur-containing compound as a cross-linking agent, jointly using a cross-linking accelerator and cross-linking activator is preferable. Examples of the cross-linking accelerator include a sulfenamide-based cross-linking accelerator; guanidine-based cross-linking accelerator; thiourea-based cross-linking accelerator; thiazole-based cross-linking accelerator; thiuram-based cross-linking accelerator; dithiocarbamic acid-based cross-linking accelerator; xanthic acid-based cross-linking accelerator; and the like. Among these as well, one including a sulfenamide-based cross-linking accelerator is preferable. These cross-linking accelerators are used as single type alone or as two or more types combined. The amount of cross-linking accelerator is preferably 0.1 to 15 parts by weight with respect to 100 parts by weight of the rubber ingredients, including the conjugated diene rubber, in the rubber composition, more preferably 0.5 to 5 parts by weight, particularly preferably 1 to 4 parts by weight.

Examples of the cross-linking activator include higher fatty acids such as stearic acid; zinc oxide; and the like. These cross-linking activators are used as single type alone or as two or more types combined. The amount of the cross-linking activator is preferably 0.05 to 20 parts by weight with respect to 100 parts by weight of the rubber ingredients, including the conjugated diene rubber, in the rubber composition, particularly preferably 0.5 to 15 parts by weight.

Further, in the rubber composition used in the present invention, a plurality of kinds of rubbers may be used in combination as the conjugated diene rubber. For example, in the case of using a conjugated diene rubber including at least a modified conjugated diene rubber having a modifying group, which is obtained by the above-described production method, as the modified conjugated diene having a modifying group, two or more kinds of rubber (e.g., rubbers having different modifying groups from each other) may be used in combination, or a rubber obtained by combining another unmodified conjugated diene rubber with one kind or two or more kinds of modified conjugated diene rubber may be used. Examples of such an another unmodified conjugated diene rubber include natural rubber, polyisoprene rubber, emulsion polymerized styrene-butadiene copolymer rubber, solution polymerized styrene-butadiene copolymer rubber, polybutadiene rubber (high cis-BR or low cis BR, further, polybutadiene rubber containing crystal fibers made of 1,2-polybutadiene polymer also possible), styrene-isoprene copolymer rubber, butadiene-isoprene copolymer rubber, styrene-isoprene-butadiene copolymer rubber, acrylonitrile-butadiene copolymer rubber, and acrylonitrile-styrene-butadiene copolymer rubber. Among these as well, natural rubber, polyisoprene rubber, polybutadiene rubber, and solution polymerized styrene-butadiene copolymer rubber are preferable. These rubbers can be used as single type alone or as two or more types combined. Further, a rubber other than a conjugated diene rubber may be blended in the rubber composition used in the present invention.

The content ratio of the modified conjugated diene rubber in the case of using a material including at least a modified conjugated diene rubber having a modifying group obtained by the above-described production method preferably accounts for 10 to 100% by weight of the rubber ingredients in the rubber composition used in the present invention, and particularly preferably accounts for 50 to 100% by weight. As a result of the conjugated diene rubber being included in the rubber ingredients in such a ratio, a cross-linked rubber having better low heat buildup and wet grip can be obtained.

As the method of obtaining the rubber composition used in the present invention, it is sufficient to employ a method in which the ingredients are kneaded according to an ordinary method. For example, it is possible to knead the blending agents such as an inorganic filler, other than thermally unstable ingredients such as a cross-linking agent and a cross-linking accelerator, with the rubber ingredients, including the conjugated diene rubber, then mix thermally unstable ingredients such as a cross-linking agent and a cross-linking accelerator with the kneaded material to obtain the target composition. The kneading temperature of the blending agents other than the thermally unstable ingredients and the rubber ingredients is preferably 80 to 200° C., more preferably 120 to 180° C., while the kneading time is preferably 30 seconds to 30 minutes. Further, the kneaded material and thermally unstable ingredients are mixed after cooling them down to usually 100° C. or less, preferably 80° C. or less.

<Cross-Linked Rubber>

The cross-linked rubber according to the present invention is the above-mentioned cross-linked rubber obtained by crosslinking a rubber composition containing a conjugated diene rubber and an inorganic filler, wherein when a loss tangent value of a non-interface component forming, of the cross-linked rubber ingredient, a portion other than an interface with the inorganic filler is represented as L(m) and a loss tangent value of an interface component forming, of the cross-linked rubber ingredient, an interface portion with the inorganic filler is represented as L(i), each loss tangent value being measured using an atomic force microscope in a state in which sinusoidal vibrations of 5 kHz are applied to the cross-linked rubber, the cross-linked rubber has a ratio L(i)/L(m) of 0.85 or less.

According to the present invention, a cross-linked rubber having excellent wet grip, low heat buildup, and abrasion resistance can be produced by crosslinking a rubber composition containing a conjugated diene rubber and an inorganic filler, and controlling the ratio L(i)/L(m) of the cross-linked rubber, which is the ratio of the loss tangent value L(m) of the non-interface component to the loss tangent value L(i) of the interface component, to be 0.85 or less. In particular, to improve wet grip, low heat buildup, and abrasion resistance, the present inventors focused on and extensively studied the interface state between the cross-linked rubber and the inorganic filler in the cross-linked rubber, discovered that the wet grip, low heat buildup, and abrasion resistance of the cross-linked rubber can be improved by setting the ratio L(i)/L(m) of the loss tangent value L(m) of the non-interface component to the loss tangent value L(i) of the interface component in a state in which sinusoidal vibrations of 5 kHz are applied to be in the above-mentioned range.

The loss tangent value L(m) of the non-interface component is, of the cross-linked rubber portion constituting the cross-linked rubber, the loss tangent value of the cross-linked rubber portion that is not substantially affected by the inorganic filler (of the cross-linked rubber ingredient, the portion that is sufficiently distant from the inorganic filler), that is, the loss tangent value of the non-interface-forming cross-linked rubber ingredient portion. The larger this loss tangent value L(m) is, when sinusoidal vibrations of 5 kHz are applied, it can be judged that movement occurs more easily in line with the sine wave. In addition, the loss tangent value L(i) of the interface component is, of the cross-linked rubber ingredient constituting the cross-linked rubber, the loss tangent value of the cross-linked rubber ingredient portion forming the interface with the inorganic filler, that is, the loss tangent value of the interface-forming cross-linked rubber ingredient portion. The smaller this loss tangent value L(i) is, it is more difficult for movement to occur when sinusoidal vibrations of 5 kHz are applied, and as a result it can be judged that there is a strong interaction with the inorganic filler.

In the present invention, the ratio L(i)/L(m) of the loss tangent value L(m) of the non-interface component to the loss tangent value L(i) of the interface component is controlled to be 0.85 or less, and as a result the wet grip, low heat buildup, and abrasion resistance of cross-linked rubber are improved. The ratio L(i)/L(m) of the loss tangent value L(m) of the non-interface component to the loss tangent value L(i) of the interface component is preferably 0.80 or less, more preferably 0.75 or less, and even more preferably 0.60 or less. The lower limit of the ratio L(i)/L(m) is not particularly limited, but is generally 0.1 or more.

The method of measuring the loss tangent value L(m) of the non-interface component and the loss tangent value L(i) of the interface component is not particularly limited, and can be carried out by, for example, measuring the loss tangent (loss tangent=loss modulus/storage elastic modulus) at room temperature (25° C.) and preferably a resolution of 0.1 to 300 nm, more preferably a resolution of 0.1 to 100 nm, while applying sinusoidal vibrations of 5 kHz (preferably an amplitude of 1 to 10 nm) to the cross-linked rubber. Generally, an atomic force microscope is used. The atomic force microscope is not particularly limited, and an atomic force microscope manufactured by Bruker Co., an atomic force microscope manufactured by Oxford Instruments Co., Ltd., or the like can be used without limitation. In addition, in the present invention, the loss tangent is measured using an atomic force microscope, but methods other than those using an atomic force microscope may be employed. For example, any method can be used without particular limitation, as long as measurement can be carried out at the above-mentioned resolution while applying sinusoidal vibrations of 5 kHz. In the present invention, the loss tangent is measured by applying sinusoidal vibrations of 5 kHz, but the frequency of the sinusoidal wave can be changed by changing the measurement temperature (e.g., by setting the temperature to a temperature other than 25° C.). Specifically, it is also possible to perform the measurement by changing the measurement temperature and the frequency of the sinusoidal wave so as to obtain the same conditions as when sinusoidal vibrations of 5 kHz are applied at 25° C.

Specific examples of the method for measuring the loss tangent value L(m) of the non-interface component and the loss tangent value L(i) of the interface component include the methods described in "Nanorheological Mapping of Rubbers by Atomic Force microscopy", macromolecules, 46, 1916-1922 (2013) and "Viscoelasticity of Inhomogeneous Polymers Characterized by Loss Tangent Measurements Using Atomic Force Microscopy, macromolecules, 47, 7971-7977 (2014), and the like.

To give an example, firstly, the cross-linked rubber is sliced to obtain a test piece. Then, using an atomic force microscope, a force volume measurement of a 1 μm×1 μm range of the obtained test piece is carried out at 25° C. at a resolution of 64×64 (resolution of 15.6 nm) to obtain an elastic modulus X at each measurement site. Next, a histogram is created for the elastic modulus X at each measurement site with the elastic modulus X on the abscissa and frequency on the ordinate. The created histogram is analyzed by a Gaussian function to calculate a mean value Xm and a standard deviation σ of the elastic modulus of the cross-linked rubber ingredient. Then, measurement sites where $Xm-2\sigma \leq X \leq Xm+2\sigma$ are identified as, of the cross-linked rubber ingredient constituting the cross-linked rubber, the cross-linked rubber ingredient portion that is not substantially affected by the inorganic filler (of the cross-linked rubber ingredient, the portion that is sufficiently distant from the inorganic filler), that is, the non-interface-forming crosslinked rubber ingredient portion. On the other hand, measurement sites where $Xm+3\sigma \leq X \leq Xm+96$ are identified as, of the cross-linked rubber ingredient constituting the cross-linked rubber, the cross-linked rubber ingredient portion forming the interface with the inorganic filler, that is, the interface-forming cross-linked rubber ingredient portion.

Next, the test piece for which each measurement site had been identified by the above method is subjected to force volume measurement for the same range at 25° C. according to a resolution of 64×64 (resolution of 15.6 nm) using an atomic force microscope while applying sinusoidal vibrations of 5 kHz having an amplitude of 5 nm to calculate the deformation amount and phase delay of the test piece, and measure the loss tangent value L at each measurement site. Then, the mean value of the loss tangent values L at the measurement sites is calculated for each identified non-interface-forming cross-linked rubber ingredient portion and interface-forming cross-linked rubber ingredient portion, which enables the loss tangent value of the non-interface-forming cross-linked rubber ingredient portion, that is, the loss tangent value L(m) of the non-interface component forming the portion other than the interface with the inorganic filler, and the loss tangent value of the interface-forming cross-linked rubber ingredient portion, that is, the loss tangent value L(i) of the interface component forming the interface with the inorganic filler to be calculated. By calculating the ratio of these values, the ratio L(i)/L(m) can be calculated. Note that the identification of each measurement site and the measurement of the loss tangent values L(m) and L(i) may be performed separately or simultaneously.

In the above-mentioned measurement using an atomic force microscope, since the measurable resolution varies depending on the size of the probe used for the measurement, to enable measurement at the above-mentioned resolution, as the probe, it is preferable to use a probe having a radius of curvature of 1 to 100 nm (e.g., a cantilever having a tip with such a radius of curvature), and it is more preferable to use a probe having a tip radius of curvature of 1 to 30 nm. As the cantilever, it is preferable to use a cantilever having a spring constant of 0.05 to 100 N/m, more preferable to use a cantilever having a spring constant of 0.2 to 40 N/m, and even more preferable to use a cantilever having a spring constant of 0.5 to 5 N/m. As the cantilever, it is also preferable to use a cantilever having a resonance frequency of 1 to 2000 kHz, more preferable to use a cantilever of 10 to 500 kHz, and still more preferable to use a cantilever of 40 to 100 kHz.

In the present invention, the method of setting the ratio L(i)/L(m) of the loss tangent value L(m) of the non-interface component and the loss tangent value L(i) of the interface component to the above-mentioned range is not particularly limited. Examples of the method may include a method of adjusting the molecular weight of the conjugated diene rubber, the content ratio of the aromatic vinyl unit, the vinyl bond content in the conjugated diene monomer unit, or the type and introduction ratio of the modifying group to be introduced used in preparing the rubber composition for forming the cross-linked rubber, a method of adjusting the amount and particle size of the inorganic filler used in preparing the rubber composition, and furthermore, a method of adjusting the kneading conditions in the preparation of the rubber composition, and the like. Further, it is desirable to combine these methods appropriately.

The method of producing the cross-linked rubber of the present invention is not particularly limited, and may be carried out by, for example, shaping the above-mentioned rubber composition by a forming machine corresponding to the desired shape, for example, an extruder, injection molding machine, press, rolls, etc., and heating it for a cross-linking reaction to fix the shape as a cross-linked product. In this case, the product may be cross-linked after shaping it in advance or may be cross-linked simultaneously with shaping. The shaping temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 12 hours, particularly preferably 3 minutes to 6 hours.

Further, depending on the shape, size, etc. of cross-linked rubber, sometimes even if the surface is cross-linked, the inside is not sufficiently cross-linked, so the cross-linked rubber may be further heated for secondary cross-linking.

As the heating method of cross-linking the rubber composition, it is sufficient to suitably select press heating, steam heating, oven heating, hot air heating, and other general methods used for cross-linking rubber.

In the cross-linked rubber of the present invention, the ratio L(i)/L(m) between the loss tangent value L(m) of the non-interface component and the loss tangent value L(i) of the interface component is controlled to be 0.85 or less, and as a result exhibits excellent wet grip, low heat buildup, and abrasion resistance. Further, the cross-linked rubber of the present invention, by making use of these characteristics, can for example, be used for materials for parts of tires such as cap treads, base treads, carcasses, side walls, and bead parts; materials of industrial products such as hoses, belts, mats, and vibration absorbing rubber; agents for improving the impact resistance of resins; resin film buffer agents; shoe soles; rubber shoes; golf balls; toys; and other various applications. In particular, since the cross-linked rubber of the present invention exhibits excellent wet grip, low heat buildup, and abrasion resistance, it can be suitably used as a tire material, and in particular as a material for low fuel consumption tires.

EXAMPLES

Below, the present invention is described with reference to further detailed examples but is not limited thereto. Note that, in the below, the term "parts" is based on weight unless particularly stated otherwise. Additionally, the tests and evaluation were performed by the following methods.

[Molecular Weight of Conjugated Diene Rubber]

The molecular weight of the conjugated diene rubber was determined as a molecular weight in terms of polystyrene by gel permeation chromatography. Specific measurement conditions were as follows.

Measurement device: High performance liquid chromatograph (made by Tosoh, product name "HLC-8320")

Column: Two columns (product name: "GMH—HR-H", manufactured by Tosoh) connected in series.

Detector: Differential refractometer (product name: "RI-8320", manufactured by Tosoh)

Eluent: tetrahydrofuran

Column temperature: 40° C.

[Microstructure of Conjugated Diene Rubber]

Measured by $^1$H-NMR.

Measurement device: (product name: "JNM-ECA-400 WB", manufactured by JEOL

Measurement solvent: Deuterated chloroform

[Glass Transition Temperature of Conjugated Diene Rubber]

The glass transition temperature (Tg) of the conjugated diene rubber was measured under the following conditions by differential scanning calorimetry (DSC).

Measurement device: Pyris 1 DSC (manufactured by Perkin Elmer)

Rate of temperature increase: 10° C./min

[Ratio L(i)/L(m) of Loss Tangent Value L(m) of Non-Interface Component to Loss Tangent Value L(i) of Interface Component]

A test piece was prepared by extracting a cross-linked rubber in accordance with JIS K6229 and then slicing the extracted cross-linked rubber with an ultramicrotome (Leica EM UC 7, manufactured by Leica Microsystems Co., Ltd.) with a glass knife in an atmosphere of −100° C.

The elastic modulus via a cantilever as a measuring probe was measured using an atomic force microscope (product name: "Dimension Icon AFM" manufactured by Bruker Co., Ltd.) by performing a force volume measurement for a 1 μm×1 μm range of an arbitrary five points of the test piece at 25° C. at a resolution of 64×64 (resolution of 15.6 nm) to obtain an elastic modulus image with a field of view of 1 μm×1 μm. For the measurement, a cantilever (product name: "CMCL AC 240-TS", manufactured by Olympus Corporation, spring constant 2 N/m, resonance frequency 70 kHz, tip radius of curvature 7 nm) was used as the measurement probe. Based on the obtained elastic modulus image of the test piece, a histogram having elastic modulus X on the abscissa and frequency on the ordinate was created. The created histogram was analyzed by a Gaussian function to calculate the mean value Xm and the standard deviation 6 of the elastic modulus of the cross-linked rubber ingredient. Then, the measurement sites where the measured elastic modulus X was Xm−2σ≤X≤Xm+2σ were identified as the non-interface-forming cross-linked rubber ingredient portion forming the portion other than the interface with silica, and the measurement sites where the measured elastic modulus X was Xm+3σ≤X≤Xm+9σ were identified as the interface-forming cross-linked rubber ingredient portion forming the interface with silica.

Next, while producing sinusoidal vibrations of 5 kHz having an amplitude of 5 nm by using lock-in amplifier (Model 7280, manufactured by Signal Recovery) to drive a high-frequency piezoelectric actuator (product name: "NAC2011-A01", manufactured by Noliac) independently arranged on a sample stage with a piezoelectric scanner, for the same field of view of the test piece, the deformation amount and the phase delay of the test piece were measured via a cantilever as the measurement probe by performing a force volume measurement on the sample on the sample stage at 25° C. at a resolution of 64×64 (resolution of 15.6 nm) using an atomic force microscope (product name: "Dimension Icon AFM" manufactured by Bruker Co., Ltd.). As a result, the loss tangent for a field of view of 1 μm×1 μm was obtained. Note that for the measurement, a cantilever (product name: "CMCL AC 240-TS", manufactured by Olympus Corporation, spring constant 2 N/m, resonance frequency 70 kHz, tip radius of curvature 7 nm) was used as the measurement probe. The measurement was performed in a state in which sinusoidal vibrations of 5 kHz were applied by introducing a stationary time during the period that the cantilever and the test piece were in contact during the force volume measurement.

Further, regarding the loss tangent value L at each measurement site, the average value of each of the non-interface-forming cross-linked rubber ingredient portion and the interface-forming cross-linked rubber ingredient portion identified above was calculated, based on which the loss tangent value of the non-interface-forming cross-linked rubber ingredient portion, that is, the loss tangent value L(m) of the non-interface component forming the portion other than the interface with silica, and the loss tangent value of the interface-forming cross-linked rubber ingredient portion, that is, the loss tangent value L(i) of the interface component forming the interface with silica, were calculated. Then, the ratio of these was calculated to determine the ratio L(i)/L(m).

[Wet Grip] A test piece of a cross-linked rubber shaped to a length of 50 mm, width of 12.7 mm, and thickness of 2 mm was measured for the value of tan δ at 0° C. using a viscoelasticity measuring device (product name: "ARES" manufactured by Rheometrics) under conditions of a dynamic stress of 0.5% and 10 Hz. The value of this tan δ was shown indexed to the measured value of Comparative Example 1 as 100. The smaller this index, the better the wet grip.

[Low Heat Buildup] A test piece of a cross-linked rubber shaped to a length of 50 ram, width of 12.7 mm, and thickness of 2 mm was measured for the value of tan δ at 60° C. using a viscoelasticity measuring device (product name: "ARES" manufactured by Rheometrics) under conditions of a dynamic stress of 2.5% and 10 Hz. The value of this tan δ was shown indexed to the measured value of Comparative Example 1 as 100. The smaller this index is, the better the low heat buildup.

[Abrasion Resistance]

Measurement was carried out on a test piece of a cross-linked rubber shaped to an outer diameter of 50 mm, an inner diameter of 15 mm, and a thickness of 10 mm using a FPS abrasion tester (manufactured by Ueshima Seisakusho Co., Ltd.) under a load of 1 kgf and a slip ratio of 3%. The abrasion resistance was shown indexed to the measured value of Comparative Example 1 as 100. The larger this index is, the better the abrasion resistance.

Example 1

[Production of Modified Conjugated Diene Rubber 1]

Under nitrogen atmosphere, 800 parts of cyclohexane, 78 parts of 1,3-butadiene, 52 parts of styrene, and 0.001 parts of tetramethylethylenediamine were charged into an autoclave, and 1.1 mmol of n-butyllithium was then added to start polymerization at 60° C. The polymerization reaction was continued for 60 minutes. After confirming that the polymerization conversion rate was in the range of 95% to 100%, the modifying agent represented by the following formula (11) was added in xylene solution having a concentration of 20% such that the added amount was 0.05 times the moles of the amount of use of n-butyllithium. The resultant mixture was reacted for 30 minutes, and 0.064 parts of methanol was added as a polymerization terminator to obtain a conjugated diene rubber. Then, 0.15 parts of 2,4-bis[(octylthio)methyl]-o-cresol (product name: "Irganox 1520", manufactured by Ciba Specialty Chemicals Co., Ltd.) was added as an antiaging agent to 100 parts of the obtained polymer ingredient. The mixture was then subjected to steam stripping to remove the solvent, and vacuum dried at 60° C. for 24 hours to obtain a solid modified conjugated diene rubber 1. The weight average molecular weight (Mw) of the obtained modified conjugated diene rubber 1 was 520,000. The styrene unit content in this modified conjugated diene rubber 1 was 40.2% by weight, the vinyl bond content in the butadiene unit was 10.2 mol %, and the glass transition temperature was −20.2° C.

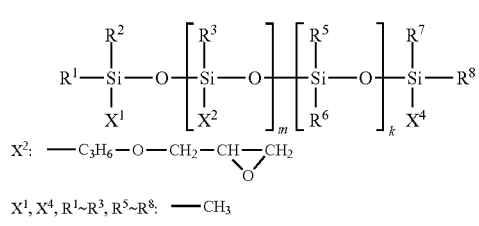

X²: —C₃H₆—O—CH₂—CH—CH₂
                        \\O/

X¹, X⁴, R¹~R³, R⁵~R⁸: —CH₃ m = 80, k = 120

[Production of Rubber Composition and Cross-Linked Rubber]

In a 250 ml Brabender type mixer, 100 parts of the modified conjugated diene rubber 1 obtained above was masticated for 30 seconds, next 23 parts of silica (product name: "Zeosil 1165MP", manufactured by Rhodia), and 6.4 parts of the silane coupling agent bis(3-(triethoxysilyl)propyl)tetrasulfide (product name "Si69", manufactured by Degussa) were added and kneaded at a starting temperature of 110° C. for 1.5 minutes, then 27 parts of silica (product name "Zeosil 1165MP", manufactured by Rhodia), 3 parts of zinc oxide, 2 parts of stearic acid, and 2 parts of an antiaging agent N-phenyl-N'-(1,3-dimethylbutyl)-p-phenylene diamine (product name "Nocrac 6C", manufactured by Ouchi Shinko Chemical Industrial) were added and the mixture was further kneaded for 2.5 minutes, then the kneaded material was discharged from the mixer. The temperature of the kneaded material after the end of kneading was 150° C. The obtained kneaded material was cooled down to room temperature, then kneaded again in a Brabender type mixer at a starting temperature of 110° C. for 2 minutes, and subsequently discharged from the mixer. Next, using open rolls at 50° C., to the obtained kneaded material, 1.5 parts of sulfur, 1.8 parts of a cross-linking accelerator N-cyclehexyl-2-benzothiazolylsulfenamide (product name "Noccelar CZ-G", manufactured by Ouchi Shinko Chemical Industrial), and 1.5 parts of a cross-linking accelerator 1,3-diphenylguanidine (product name "Noccelar D", manufactured by Ouchi Shinko Chemical Industrial) were added and kneaded, and then a sheet-like rubber composition was taken out.

Next, the obtained rubber composition was pressed to cross-link at 160° C. for 20 minutes to prepare a test piece of a cross-linked rubber. This test piece was evaluated for the ratio L(i)/L(m), which is the ratio of the loss tangent value L(m) of the non-interface component to the loss tangent value L(i) of the interface component, wet grip, low heat buildup, and abrasion resistance. The results are shown in Table 1.

Example 2

[Production of Modified Conjugated Diene Rubber 2, Rubber Composition, and Cross-Linked Rubber]

A solid modified conjugated diene rubber 2 was obtained in the same manner as in Example 1, except that the amount of use of tetramethylethylenediamine was changed to 0.0005 parts and the amount of use of n-butyllithium was changed to 0.7 mmoles. The weight average molecular weight (Mw) of the obtained modified conjugated diene rubber 2 was 1,020,000. The styrene unit content in this modified conjugated diene rubber 2 was 40% by weight, the vinyl bond content in the butadiene unit was 10 mol %, and the glass transition temperature was −20.2° C. Further, a rubber composition and a cross-linked rubber were also obtained and evaluated in the same manner as in Example 1, except that the modified conjugated diene rubber 2 obtained as above was used instead of the modified conjugated diene rubber 1. The results are shown in Table 1.

Example 3

[Production of Modified Conjugated Diene Rubber 3, Rubber Composition, and Cross-Linked Rubber]

A solid modified conjugated diene rubber 3 was obtained in the same manner as in Example 2, except that instead of the modifying agent represented by the above general formula (11), 0.16 parts of a modifying agent represented by the following general formula (12) (1.5 times the moles of the amount of use of n-butyllithium) was used without diluting with xylene. The weight average molecular weight (Mw) of the obtained modified conjugated diene rubber 3 was 510,000. The styrene unit content in this modified conjugated diene rubber 3 was 40% by weight, the vinyl bond content in the butadiene unit was 10 mol %, and the glass transition temperature was −20.4° C.

Further, a rubber composition and a cross-linked rubber were also obtained and evaluated in the same manner as in Example 1, except that the modified conjugated diene rubber 3 obtained as above was used instead of the modified conjugated diene rubber 1. The results are shown in Table 1.

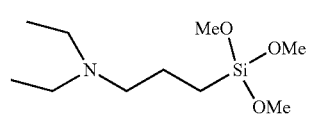

Example 4

[Production of Modified Conjugated Diene Rubber 4, Rubber Composition, and Cross-Linked Rubber]

A solid modified conjugated diene rubber 4 was obtained in the same manner as in Example 3, except that the amount of use of tetramethylethylenediamine was changed to 0.0003 parts and the amount of use of n-butyllithium was changed to 0.46 mmoles. The weight average molecular weight (Mw) of the obtained modified conjugated diene rubber 4 was 1,020,000. The styrene unit content in this modified conjugated diene rubber 4 was 40.2% by weight, the vinyl bond content in the butadiene unit was 10.2 mol %, and the glass transition temperature was −20.4° C. Further, a rubber composition and a cross-linked rubber were also obtained and evaluated in the same manner as in Example 1, except that the modified conjugated diene rubber 4 obtained as above was used instead of the modified conjugated diene rubber 1. The results are shown in Table 1.

Example 5

[Production of Modified Conjugated Diene Rubber 5, Rubber Composition, and Cross-Linked Rubber]

A solid modified conjugated diene rubber 5 was obtained in the same manner as in Example 2, except that instead of the modifying agent represented by the above general formula (11), 0.208 parts of a modifying agent represented by the following general formula (13) (1.5 times the moles of the amount of use of n-butyllithium) was used without diluting with xylene. The weight average molecular weight (Mw) of the obtained modified conjugated diene rubber 5 was 530,000. The styrene unit content in this modified conjugated diene rubber 5 was 40% by weight, the vinyl bond content in the butadiene unit was 10 mol %, and the glass transition temperature was −20.1° C.

Further, a rubber composition and a cross-linked rubber were also obtained and evaluated in the same manner as in Example 1, except that the modified conjugated diene rubber 5 obtained as above was used instead of the modified conjugated diene rubber 1. The results are shown in Table 1.

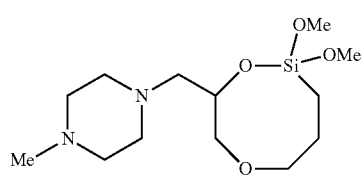

(13)

Example 6

[Production of Modified Conjugated Diene Rubber 6, Rubber Composition, and Cross-Linked Rubber]

A solid modified conjugated diene rubber 6 was obtained in the same manner as in Example 5, except that the amount of use of tetramethylethylenediamine was changed to 0.0003 parts and the amount of use of n-butyllithium was changed to 0.46 mmoles. The weight average molecular weight (Mw) of the obtained modified conjugated diene rubber 6 was 1,000,000. The styrene unit content in this modified conjugated diene rubber 6 was 40% by weight, the vinyl bond content in the butadiene unit was 10 mol %, and the glass transition temperature was −20.1° C. Further, a rubber composition and a cross-linked rubber were also obtained and evaluated in the same manner as in Example 1, except that the modified conjugated diene rubber 6 obtained as above was used instead of the modified conjugated diene rubber 1. The results are shown in Table 1.

Example 7

[Production of Modified Conjugated Diene Rubber 7, Rubber Composition, and Cross-Linked Rubber]

A solid modified conjugated diene rubber 7 was obtained in the same manner as in Example 2, except that instead of the modifying agent represented by the above general formula (11), 0.33 parts of a modifying agent represented by the following general formula (14) (1.5 times the moles of the amount of use of n-butyllithium) was used without diluting with xylene. The weight average molecular weight (Mw) of the obtained modified conjugated diene rubber 7 was 530,000. The styrene unit content in this modified conjugated diene rubber 7 was 40% by weight, the vinyl bond content in the butadiene unit was 10 mol %, and the glass transition temperature was −20.0° C.

Further, a rubber composition and a cross-linked rubber were also obtained and evaluated in the same manner as in Example 1, except that the modified conjugated diene rubber 7 obtained as above was used instead of the modified conjugated diene rubber 1. The results are shown in Table 1.

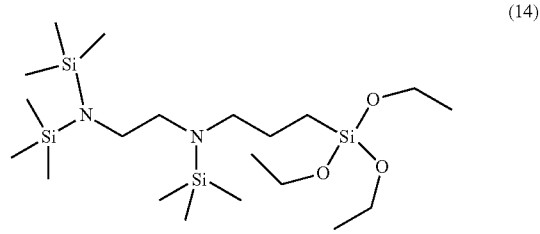 [SMILES: CCO[Si](CCCN(CCN([Si](C)(C)C)[Si](C)(C)C)[Si](C)(C)C)(OCC)OCC]

(14)

Example 8

[Production of Modified Conjugated Diene Rubber 8, Rubber Composition, and Cross-Linked Rubber]

A solid modified conjugated diene rubber 8 was obtained in the same manner as in Example 7, except that the amount of use of tetramethylethylenediamine was changed to 0.0003 parts and the amount of use of n-butyllithium was changed to 0.46 mmoles. The weight average molecular weight (Mw) of the obtained modified conjugated diene rubber 8 was 1,080,000. The styrene unit content in this modified conjugated diene rubber 8 was 40.2% by weight, the vinyl bond content in the butadiene unit was 10.2 mol %, and the glass transition temperature was −20.0° C. Further, a rubber composition and a cross-linked rubber were also obtained and evaluated in the same manner as in Example 1, except that the modified conjugated diene rubber 8 obtained as above was used instead of the modified conjugated diene rubber 1. The results are shown in Table 1.

Comparative Example 1

[Production of Unmodified Conjugated Diene Rubber 9, Rubber Composition, and Cross-Linked Rubber]

A solid unmodified conjugated diene rubber 9 was obtained in the same manner as in Example 2, except that the modifying agent represented by the above general formula (11) was not added. The weight average molecular weight (Mw) of the obtained unmodified conjugated diene rubber 9 was 520,000. The styrene unit content in this unmodified conjugated diene rubber 9 was 40.1% by weight, the vinyl bond content in the butadiene unit was 10.2 mol %, and the glass transition temperature was −20.4° C. Further, a rubber composition and a cross-linked rubber were also obtained and evaluated in the same manner as in Example 1, except that the unmodified conjugated diene rubber 9 obtained as above was used instead of the modified conjugated diene rubber 1. The results are shown in Table 2.

Comparative Example 2

[Production of Unmodified Conjugated Diene Rubber 10, Rubber Composition, and Cross-Linked Rubber]

A solid unmodified conjugated diene rubber 10 was obtained in the same manner as in Comparative Example 1, except that the amount of use of styrene was changed to 54.6 parts and the amount of use of tetramethylethylenediamine was changed to 0.04 parts. The weight average molecular weight (Mw) of the obtained unmodified conjugated diene rubber 10 was 530,000. The styrene unit content in this unmodified conjugated diene rubber 10 was 42% by weight, the vinyl bond content in the butadiene unit was 35 mol %, and the glass transition temperature was −3.9° C.

Further, a rubber composition and a cross-linked rubber were also obtained and evaluated in the same manner as in Comparative Example 1, except that the unmodified conjugated diene rubber 10 obtained as above was used instead of the modified conjugated diene rubber 9. The results are shown in Table 2.

Comparative Example 3

[Production of Unmodified Conjugated Diene Rubber 11, Rubber Composition, and Cross-Linked Rubber]

A solid unmodified conjugated diene rubber 10 was obtained in the same manner as in Comparative Example 1, except that the amount of use of tetramethylethylenediamine was changed to 0.0003 parts and the amount of use of n-butyllithium was changed to 0.46 mmoles. The weight average molecular weight (Mw) of the obtained unmodified conjugated diene rubber 11 was 1,010,000. The styrene unit content in this unmodified conjugated diene rubber 11 was 40% by weight, the vinyl bond content in the butadiene unit was 10 mol %, and the glass transition temperature was −20.4° C. Further, a rubber composition and a cross-linked rubber were also obtained and evaluated in the same manner as in Comparative Example 1, except that the unmodified conjugated diene rubber 11 obtained as above was used instead of the modified conjugated diene rubber 9. The results are shown in Table 2.

Comparative Example 4

[Production of modified Conjugated Diene Rubber 12, Rubber Composition, and Cross-Linked Rubber]

A solid modified conjugated diene rubber 12 was obtained in the same manner as in Example 1, except that instead of the modifying agent represented by the above general formula (11), 0.10 parts of tetramethoxysilane as a modifying agent (1.5 times the moles of the amount of use of n-butyllithium) was used without diluting with xylene, and that the amount of use of styrene was changed to 54.6 parts and the amount of use of tetramethylethylenediamine was changed to 0.04 parts. The weight average molecular weight (Mw) of the obtained modified conjugated diene rubber 12 was 520,000. The styrene unit content in this modified conjugated diene rubber 12 was 42% by weight, the vinyl bond content in the butadiene unit was 35 mol %, and the glass transition temperature was −3.8° C.

Further, a rubber composition and a cross-linked rubber were also obtained and evaluated in the same manner as in Example 1, except that the modified conjugated diene rubber 12 obtained as above was used instead of the modified conjugated diene rubber 1. The results are shown in Table 2.

Comparative Example 5

[Production of modified Conjugated Diene Rubber 13, Rubber Composition, and Cross-Linked Rubber]

A solid modified conjugated diene rubber 13 was obtained in the same manner as in Example 1, except that instead of the modifying agent represented by the above general formula (11), 0.052 parts of tetramethoxysilane as a modifying agent (1.5 times the moles of the amount of use of n-butyllithium) was used without diluting with xylene, and that the amount of use of tetramethylethylenediamine was changed to 0.0003 parts and the amount of use of n-butyllithium was changed to 0.46 mmoles. The weight average molecular weight (Mw) of the obtained modified conjugated diene rubber 13 was 1,050,000. The styrene unit content in this modified conjugated diene rubber 13 was 40% by weight, the vinyl bond content in the butadiene unit was 10 mol %, and the glass transition temperature was −20.4° C.

Further, a rubber composition and a cross-linked rubber were also obtained and evaluated in the same manner as in Example 1, except that the modified conjugated diene rubber 13 obtained as above was used instead of the modified conjugated diene rubber 1. The results are shown in Table 2.

TABLE 1

| | Example | | | | | | | |
|---|---|---|---|---|---|---|---|---|
| | 1 | 2 | 3 | 4 | 5 | 6 | 7 | 8 |
| | Conjugated Diene Rubber | | | | | | | |
| Styrene unit Content (% by weight) | 40.2 | 40 | 40 | 40.2 | 40 | 40 | 40 | 40.2 |
| Vinyl Bond Content (mol %) | 10.2 | 10 | 10 | 10.2 | 10 | 10 | 10 | 10.2 |
| Weight Average Molecular Weight | 520,000 | 1,020,000 | 510,000 | 1,020,000 | 530,000 | 1,000,000 | 530,000 | 1,080,000 |
| Glass Transition Temperature (° C.) | −20.2 | −20.2 | −20.4 | −20.4 | −20.1 | −20.1 | −20.0 | −20.0 |
| Modifying Agent | *structure* | *structure* | *structure* | *structure* | *structure* | *structure* | *structure* | *structure* |
| | Evaluation | | | | | | | |
| | Loss Tangent Value of Cross-linked Rubber | | | | | | | |
| L(i)/L(m) | 0.73 | 0.70 | 0.64 | 0.61 | 0.52 | 0.54 | 0.76 | 0.77 |
| Wet Grip | 115 | 111 | 118 | 121 | 131 | 126 | 117 | 112 |
| Low Heat Buildup | 85 | 82 | 85 | 81 | 75 | 77 | 91 | 95 |
| Abrasion Resistance | 109 | 114 | 111 | 116 | 126 | 124 | 108 | 110 |

*"Me" in the structural formulas of the above modifying agents represents a methyl group.

TABLE 2

| | Comparative Example | | | | |
|---|---|---|---|---|---|
| | 1 | 2 | 3 | 4 | 5 |
| Conjugated Diene Rubber | | | | | |
| Styrene Unit Content (% by weight) | 40.1 | 42 | 40 | 42 | 40 |
| Vinyl Bond Content (mol %) | 10.2 | 35 | 10 | 35 | 10 |
| Weight Average Molecular Weight | 520,000 | 530,000 | 1,010,000 | 520,000 | 1,050,000 |
| Glass Transition Temperature (° C.) | −20.4 | −3.9 | −20.4 | −3.8 | −20.4 |
| Modifying Agent | none (unmodified) | | | tetramethoxysilane | |
| Loss Tangent Value of Cross-linked Rubber | | | | | |
| L(i)/L(m) | 0.95 | 0.91 | 0.92 | 0.89 | 0.92 |
| Evaluation | | | | | |
| Wet Grip | 100 | 140 | 102 | 146 | 95 |
| Low Heat Buildup | 100 | 110 | 109 | 95 | 99 |
| Abrasion Resistance | 100 | 75 | 111 | 82 | 112 |

From Table 1 and Table 2, it can be seen that when the ratio L(i)/L(m) of the loss tangent value L(m) of the non-interface component to the loss tangent value L(i) of the interface component is 0.85 or less, the cross-linked rubber has excellent wet grip, low heat buildup, and abrasion resistance (Examples 1 to 8).

In contrast, when the ratio L(i)/L(m) of the loss tangent value L(m) of the non-interface component to the loss tangent value L(i) of the interface component is more than 0.85, wet grip, low heat buildup, and abrasion resistance were poor (Comparative Examples 1 to 5).

The invention claimed is:

1. A cross-linked rubber obtained by crosslinking a rubber composition comprising (i) a rubber ingredient containing a conjugated diene rubber; and (ii) an inorganic filler, wherein:
    the cross-linked rubber has a ratio L(i)/L(m) of 0.85 or less, where:
        L(i) is a loss tangent value of an interface component of the cross-linked rubber ingredient, the interface component being an interface portion of the cross-linked rubber ingredient forming an interface with the inorganic filler,
        L(m) is a loss tangent value of a non-interface component of the cross-linked rubber ingredient, the non-interface component being a portion of the cross-linked rubber ingredient other than the interface portion, and
        L(i) and L(m) are measured using an atomic force microscope in a state in which sinusoidal vibrations of 5 kHz are applied to the cross-linked rubber,
    the weight average molecular weight (Mw) of the conjugated diene rubber is in the range of from 510,000 to 2,000,000.

2. The cross-linked rubber according to claim 1, wherein the conjugated diene rubber is a modified conjugated diene rubber having a modifying group.

3. The cross-linked rubber according to claim 2, wherein the conjugated diene rubber is a modified conjugated diene rubber having a modifying group derived from a silicon atom-containing modifying agent.

4. The cross-linked rubber according to claim 3, wherein the conjugated diene rubber is a modified conjugated diene rubber having a modifying group derived from a siloxane compound or a nitrogen-containing silane compound.

5. The cross-linked rubber according to claim 1, wherein the conjugated diene rubber has a glass transition temperature (Tg) of −40 to −10° C.

6. The cross-linked rubber according to claim 1, wherein the conjugated diene rubber has a vinyl bond content in a conjugated diene monomer unit of 0 to 70 mol %.

7. The cross-linked rubber according to claim 1, wherein the inorganic filler has a content of 10 to 200 parts by weight with respect to 100 parts by weight of the rubber ingredient including the conjugated diene rubber in the rubber composition.

8. The cross-linked rubber according to claim 1, wherein the inorganic filler is silica.

9. A tire comprising the cross-linked rubber according to claim 1.

* * * * *